United States Patent [19]
Baron et al.

[11] Patent Number: 5,360,469
[45] Date of Patent: * Nov. 1, 1994

[54] APPARATUS FOR AIR FILTRATION AND SOUND MASKING

[76] Inventors: Robert A. Baron, 27 Sunnyside Rd., Scotia, N.Y. 12302; Frederick Haber, Box 138, Old Chatham, N.Y. 12136

[*] Notice: The portion of the term of this patent subsequent to Mar. 9, 2010 has been disclaimed.

[21] Appl. No.: 119,349

[22] Filed: Sep. 9, 1993

[51] Int. Cl.$^5$ .............................................. B01D 46/00
[52] U.S. Cl. ............................................. 95/273; 55/318; 55/385.1; 55/467; 55/486; 96/134; 181/206; 181/295; 381/71; 422/4
[58] Field of Search .............. 55/276, 279, 318, 385.1, 55/467, 485, 486; 95/90, 287, 901, 273; 96/134; 181/206, 295, 296; 381/71; 422/4; 454/187

[56] References Cited

U.S. PATENT DOCUMENTS

| 2,945,554 | 7/1960 | Berly | 183/37 |
| 4,268,285 | 5/1981 | Mason | 55/271 |
| 4,747,364 | 5/1988 | Horowitz | 116/268 |
| 5,069,876 | 12/1991 | Oshinsky | 422/4 |
| 5,192,342 | 3/1993 | Baron et al. | 55/97 |

OTHER PUBLICATIONS

Nagar and Pandey "Affect and Performance on Cognitive Tasks as a Function of Crowding and Noise" *J. Appl. Soc. Phys.* 17, 147–157 (1987).
Kurp "Shhh—inventor is trying to concentrate" *Times Union*, C-12, Albany, N.Y., Sunday, Mar. 7, 1993.

*Primary Examiner*—Charles S. Bushey
*Attorney, Agent, or Firm*—Heslin & Rothenberg

[57] ABSTRACT

An apparatus for enhancing the environmental quality of work and living spaces which combines a high efficiency particulate air filter and an optional gas element and electric blower and a sound-masking device for generating pink noise. The sound-masking device is designed to improved the affective state, and thereby the task-performance, of persons in the space being treated.

10 Claims, 3 Drawing Sheets

APPARATUS FOR AIR FILTRATION AND SOUND MASKING

BACKGROUND OF THE INVENTION

1. Field of the Invention

The invention relates to an apparatus for enhancing the environmental quality of work and living spaces. The apparatus combines a high efficiency particulate air filter, a means for moving air and a means for sound masking.

2. Information Disclosure

In recent years, growing attention has been focused on the impact of affective states on both interpersonal behavior and cognitive processes. With respect to interpersonal behavior, it has been found that individuals are generally more benevolent toward others (e.g., less aggressive, more helpful) when experiencing positive affect than when in a neutral mood or when experiencing negative affect. With respect to cognitive processes, it appears that even relatively mild shifts in current affect can influence both the encoding and retrieval of a wide range of information. Individuals experiencing positive affect seem to organize information differently—perhaps more inclusively—than persons not experiencing such reactions. They provide more unusual associates to neutral words and perceive nontypical exemplars of a category as more representative of that category than subjects in whom positive affect has not been induced. Persons experiencing positive affect are more likely to demonstrate risk-prone behavior when potential losses are small, but more likely to demonstrate risk-avoidance when potential losses are large. Finally, individuals experiencing positive affect perform more effectively on certain tasks (one involving creative problem solving) than do controls.

As information on the behavioral and cognitive impact of affective states has accumulated, many efforts have been made to apply such knowledge to behavior in applied settings. A number of recent studies have investigated the impact of affective states upon various aspects of work-related behavior. Together, this research suggests that relatively mild shifts in affective states can exert appreciable effects on behavior in work settings. Finally, recent evidence suggests that positive affect may enhance performance on difficult tasks, especially ones requiring creativity.

Such research indicates that both positive and negative affect can be readily generated by environmental conditions. Stressors such as excessive heat, irritating noise, or unpleasant aromas generate substantial levels of negative affect. Correspondingly, several environmental factors appear to produce positive affective states, including certain kinds of music or sounds, pleasant climatic conditions, and pleasant scents or the absence of unpleasant scents. Mold, pollen, animal dander, dust and bacterial spores may reasonably be expected to induce negative affect when circulated in the air. High efficiency particulate air (HEPA) filters provide the means for removing 99.9% of particulate matter from air, but because such filters are extremely dense (they remove particles as small as 0.3 microns), they require powerful transfer blower air systems to move air through their compact network of fibers. The resulting apparatus suffers from the drawback that any known means of moving a significant volume of air generates noise roughly proportional to the volume of air being moved and filtered. The current ASHRAE standards for offices and homes require 5 to 12 minutes per air change or 66 to 160 cfm for an 8×10×10 room. Since noise, particularly the high-frequency noise of air-filtering machinery, is likely to act as a source of negative affect, [see Nagar and Pandey *J. Appl. Social Psych.* 17 147–157 (1987)] whatever positive contribution is made by removal of airborne irritants is likely to be vitiated by the noise. Although the noise problem could, in principle, be mitigated by removing the air moving machinery to a site remote from the work or living space, this is a measure that can be applied only in certain circumstances.

There is therefore a need for a portable air-moving and filtering apparatus that would filter a meaningful volume of air without bathing the work or living space in an irritating noise. The present invention combines the sound produced by the air filtering system with a deliberately created additional sound to produce a positive affect, pink noise, which effectively masks distracting noise from surrounding areas.

SUMMARY OF THE INVENTION

It is an object of the invention to enhance the quality of a work space so as to improve the behavioral and cognitive performance of persons working therein.

It is a further object of the invention to provide a portable air purifying system that includes a means for sound masking.

The invention relates to an apparatus for enhancing the environmental quality of work and living spaces consisting essentially of:
 a) a portable housing;
 b) a high efficiency particulate air (HEPA) filter mounted in said housing, said HEPA filter having an intake surface and an output, said intake surface being accessible to air from the exterior of said housing;
 c) means for generating airflow from the exterior of said housing through said HEPA filter and back to the exterior of said housing; and
 d) means, disposed in said housing, for generating sound of a frequency and strength such that the combined acoustic output of said sound generating means and said airflow generating means is broad band noise having no outstanding pure tones, said acoustic output comprising sound waves in the range from 80 Hz to 10 KHz in frequency and 10 to 70 dB in strength.

A preferred airflow is from 80 to 130 cfm (27 to 62 L/sec). The apparatus may additionally comprise a gas adsorbing filter mounted in the housing. The gas adsorbing filter has an intake surface and an output surface, and the intake surface receives air substantially entirely from the output surface of the HEPA filter. The preferred acoustic output is pink noise, and the preferred gas adsorbing filter is a charcoal filter.

In another aspect the invention relates to an apparatus for enhancing the environmental quality of a workplace consisting essentially of:
 (a) a housing having two ends and first, second and third sides;
 (b) said ends being in the form of triangles;
 (c) said first, second and third sides being in the form of rectangles;
 (d) said first, second and third sides being joined each to one other at two opposite edges of said rectangles and to said ends at two other opposite edges of said rectangles;

(e) said first side supporting a plurality of controls and an air intake;

(f) said second side providing an air outlet;

(g) said third side forming a base substantially in a horizontal plane; and (h) said housing enclosing filter means, air moving means and sound-generating means.

In yet a further aspect, the invention relates to a method for enhancing the environmental quality of a workspace consisting in combination of:

(a) lowering the level of particulate matter in a body of air within said workspace below $10^4$ particles per liter; and (b) introducing broad band noise into said workspace, said broad band noise comprising sound waves in the range from 80 Hz to 10 KHz in frequency and 10 to 70 dB in strength and having no outstanding pure tones.

DESCRIPTION OF PREFERRED EMBODIMENTS

Figure 1:
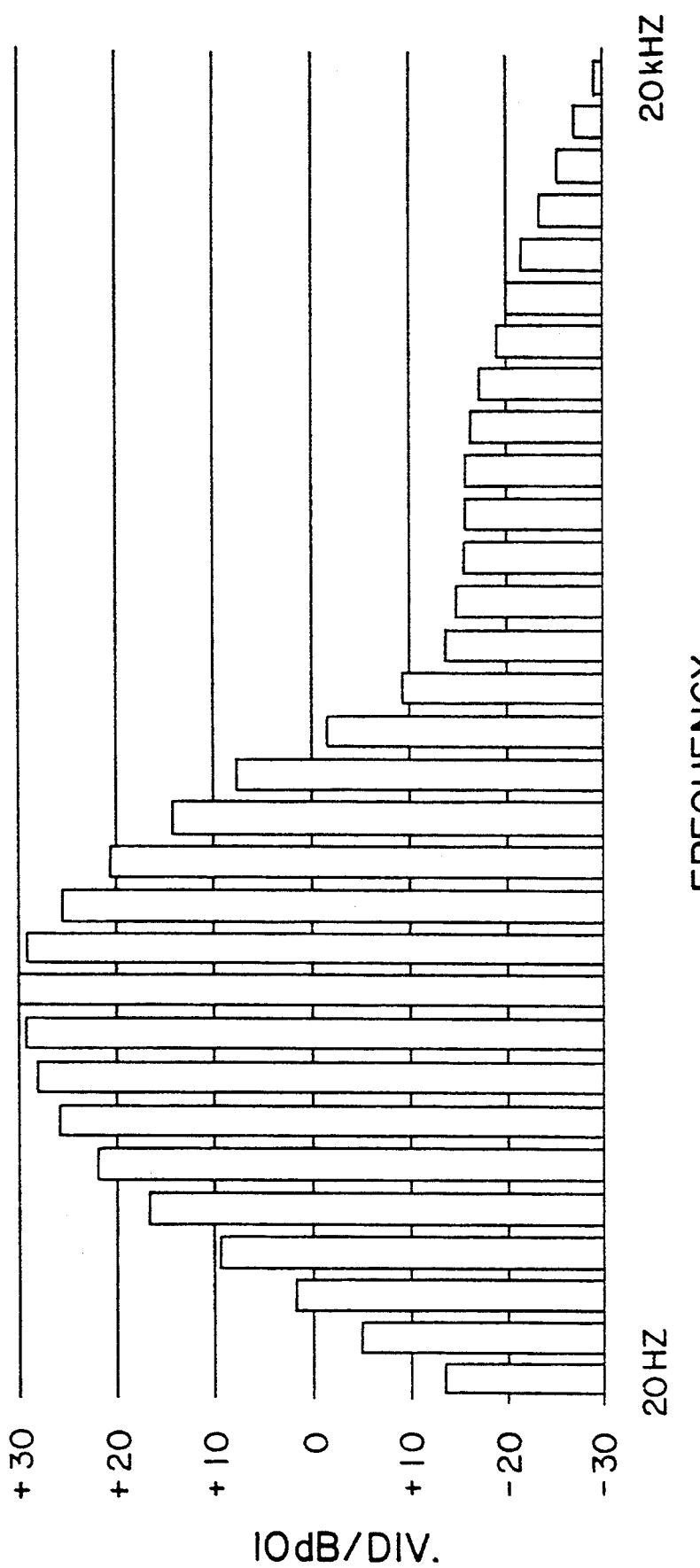
FIG. 1 is a graph of the speaker drive amplitude vs frequency of an apparatus of the invention.
Figure 2:
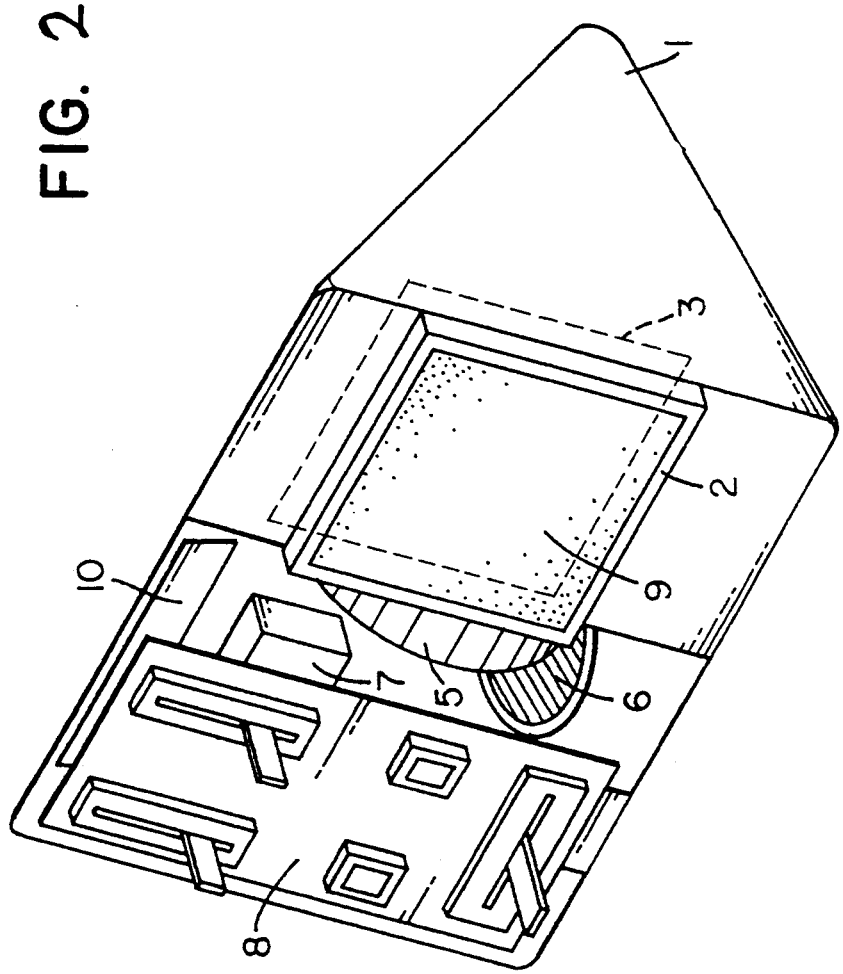
FIG. 2 is an oblique view of an apparatus according to the invention.
Figure 3:
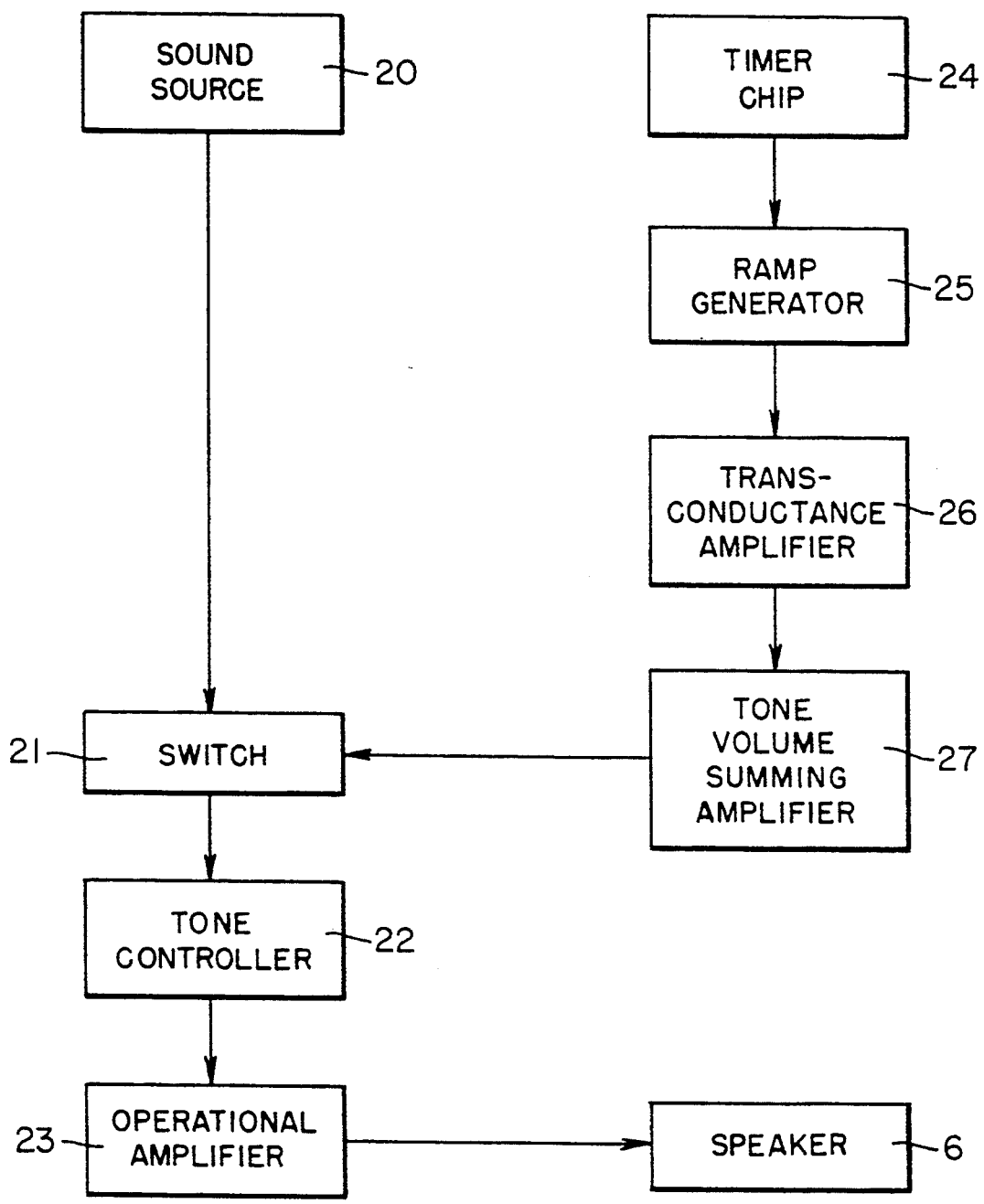
FIG. 3 is a block diagram of a sound generating circuit suitable for the invention.

A schematic diagram of an apparatus according to the invention is shown in FIG. 2. The particular embodiment shown comprises a housing 1, an HEPA filter 2, a carbon filter 3, an electric radial flow blower 5, a speaker 6, a circuit for producing pink noise 7, and controls 8 for modulating the blower speed and sound output. If desired, a prefilter may be interposed upstream of the HEPA filter. The prefilter is preferably a 20% ASHRAE filter of about 6.3 mm thickness.

In normal operation air is drawn in through intake orifice 9 by blower 5 which forces the air through filters 2 and 3 over the circuit board 7 and out the output orifice 10. The sound output of the speaker 6 is adjusted by the user to suit the user's needs at the time. The housing 1 is conveniently fabricated of galvanized or stainless steel, but may also be made from another metal such as aluminum or from a plastic. The air circulating means is preferably an electric blower of the backward curved impeller type, available from EBM Inc. (Farmington, Conn.). An optional prefilter, if present, may be any standard 20% ASHRAE dust arrestance filter. Such filters may be obtained commercially from the Farr Filter Co. (Anaheim, Calif.). The HEPA filter may be any filtering means that is capable of removing 99.97% of particles of 0.3 $\mu$m with a throughput of 80 to 130 cfm (37 to 62 L/sec). HEPA filters consist of sheets of extremely dense networks of glass fibers. These filter media are produced through a process akin to that of paper manufacture; however, fibers contained in the filter medium are glass rather than cellulose. The glass fiber strands are 0.25–3.0 microns in diameter, and are interconnected to provide a medium with very small openings (pores). Studies have shown that, under controlled conditions, a HEPA filter running at ASHRAE standard turnover rates for two hours will reduce particulate load from the normal of 0.9–1.2×$10^6$ per ft$^3$ (3.2–4.2×$10^4$ per liter) to 3.5×$10^4$ per ft$^3$ (1.2×$10^3$ per liter). The preferred HEPA filter consists of a pleated dry type filter enclosed in a rigid metal frame. Pleating greatly increases the surface area of filter medium that can be contained in a filter unit of a portable apparatus. HEPA filters that function in the invention are the Pleat-II available from HEPA Corp. (Anaheim, Calif.), the Bio-Med available from Northland Filter Co. (Mechanicville, N.Y.) and similar filters from the Schultes Corp. (Syracuse, N.Y.).

The gas adsorbing filter is preferably charcoal, zeolites or aluminum permanganate. A medium that can remove volatile organic compounds such as formaldehyde, carbon dioxide and carbon monoxide is particularly desirable. Charcoal is particularly preferred.

The charcoal filter may be any activated carbon-based filter that will provide the throughput described above. An example of such a charcoal filter is the flat isothermal charcoal filter pack available from D-Mark, Inc. (Mt. Clemans, Mich.). Charcoal of this type has a nominal surface area of 12.3×$10^6$ cm$^2$ per Kg. A combination of filters and blower that have sufficient throughput to recirculate the volume of the work or living space about five to ten times per hour satisfies ASHRAE standards.

The apparatus masks distracting noise through electronically-generated, modified white noise. Auditory masking is a well studied phenomenon of interference with the audibility of a sound caused by the presence of another sound. The masker and the signal may be identical or may differ in frequency, complexity, or time.

Four major effects are noted when both the masker and signal are pure tones and are presented simultaneously. First, the higher the level of the masker, the greater the masking. Second, masking is greatest when the frequency of the masker is in the vicinity of that of the signal. Third, the masking caused by a tone is much greater on frequencies below it. Fourth, in addition to the two tones themselves, other tones are heard which do not exist except in the listener's hearing. These tones are caused by nonlinear effects in the human hearing mechanism.

The most widely studied complex masking sound is random noise which has energy at all frequencies and is said to be flat if the level for each 1-Hz bandwidth of the noise is the same. When random-flat (white) noise is used to mask a pure tone, only a narrow frequency band (critical band) of the noise centered at the tonal frequency causes masking. When noise masks speech, either the detectability of speech or speech intelligibility can be measured. The level for speech intelligibility is about 10–14 dB higher than for speech detectability. White noise consists of sound of all frequencies between specified limits, and is analogous to white light, which contains light of all wave lengths within specified limits. In the apparatus of a preferred embodiment white noise is modified so as to include more strength in the low range and less strength in the high range. This can be accomplished through appropriate electronic circuitry as well known in the art. Shifting the sound in this fashion alters the nature (timbre) of the sound so that it has a more pleasant, soothing quality than would otherwise be the case.

The modified white noise produced by the preferred embodiment of the apparatus will be described by the term pink noise. Pink noise is technically defined as a noise whose intensity is inversely proportional to frequency over a specified range to give a constant energy per octave. For the purposes of the present invention, pink noise may be thought of as white noise in which the low frequencies are enhanced. An important characteristic is that the sound masking be a broadband noise having no "spikes" of outstanding pure tones. An outstanding pure tone is any tone that is identifiable by a listener against the background of the other frequencies. The level of discrimination of outstanding pure tones varies from individual to individual as a function of frequency and intensity. In general, in the range of 1 to 4 KHz, which is the optimum range for human hearing, an outstanding pure tone will be identified if it is more than 10% stronger than the background intensity.

The system used for generating pink noise in a preferred apparatus of the invention incorporates a volume control which can be used to adjust the masking sound to a level sufficient to mask distracting noises in the immediate environment. This makes the unit flexible for use under a very wide range of conditions and in many different settings.

The designs for circuits to produce white and pink noise are known in the art, and any circuit that produces sound from 100 Hz to 10 KHz with no outstanding pure tones will function in the invention. The preferred circuit provides an output similar to that shown in FIG. 2. The relative speaker drive amplitude is shown in dB as a function of sound frequency. Each bar represents a one-third octave band, each one-third octave band differs in strength by no more than 8 dB from its neighbors, and the drive amplitudes for frequencies from 80 to 500 Hz are 25 dB stronger than for the frequencies above 1000 Hz.

A circuit that produces controllable sound output of the proper distribution and strength is shown in the block diagram in FIG. 4. A sound source 20, typically a combination of a transistor with voltage reversed above the breakdown level, an amplifier, a high pass filter to remove the DC component and a second general purpose amplifier, provides an output to a switch 21, which uses the input from the sound source alone, or combines the input of the sound source with the input from an optional wave circuit 24–27 to be discussed below. The switch, which may incorporate a volume control, provides, at the user's discretion, an output to a tone controller 22, which is attached to an operational amplifier 23 and ultimately to a speaker 6. To produce a particularly pleasing white or pink noise that resembles the sound of ocean waves breaking on a beach, an additional wave circuit may be added. A timer chip 24 provides output to a ramp generator 25, to a transconductance amplifier 26 and thence to a tone/volume summing amplifier 27. The output of amplifier 27 is used as input by switch 21 according to the decision of the user.

The arrangement of elements shown in FIG. 2 is particularly advantageous because it minimizes overall size and improves portability. Moreover, the circuit board and transformer are cooled by filtered air which adds to longevity and dependability. Other embodiments are possible. It is also advantageous to provide the filters in a single package which may be easily removed and replaced by the user.

While the invention has been particularly shown and described with reference to preferred embodiments thereof, it will be understood by those skilled in the art that other changes in form and details may be made therein without departing from the spirit and scope of the invention.

We claim:

1. An apparatus for enhancing the environmental quality of work and living spaces consisting essentially of:
    a) a portable housing;
    b) a high efficiency particulate arresting (HEPA) filter mounted in said housing, said HEPA filter having an intake surface and an output surface, said intake surface being accessible to air from the exterior of said housing;
    c) means for generating airflow from the exterior of said housing through said HEPA filter and back to the exterior of said housing; and
    d) means, disposed in said housing, for generating sound of a frequency and strength such that the combined acoustic output of said sound generating means and said airflow generating means is broad band noise having no outstanding pure tones, said acoustic output comprising sound waves in the range from 80 Hz to 10 KHz in frequency and 10 to 70 dB in strength.

2. An apparatus according to claim 1 wherein said airflow is from 80 to 130 cfm (37 to 62 L/sec).

3. An apparatus according to claim 1 wherein said acoustic output is pink noise.

4. An apparatus according to claim 1 additionally comprising a prefilter disposed in said housing upstream of said HEPA filter.

5. An apparatus according to claim 1 wherein said means for generating sound provides a speaker drive output characterized in that each one-third octave band from 80 Hz to 10 KHz differs from its neighboring band by less than 8 dB.

6. An apparatus according to claim 5 further characterized in that said one-third octave bands are 25 dB stronger below 500 Hz than above 1000 Hz.

7. An apparatus according to claim 1 additionally comprising a gas adsorbing filter mounted in said housing, said gas adsorbing filter having an intake surface and an output surface, said intake surface of said gas adsorbing filter receiving air substantially entirely from said output surface of said HEPA filter.

8. An apparatus according to claim 7 wherein said gas adsorbing filter is a charcoal filter.

9. An apparatus for enhancing the environmental quality of a workplace consisting essentially of:
    (a) a housing having two ends and first, second and third sides;
    (b) said ends being in the form of triangles;
    (c) said first, second and third sides being in the form of rectangles;
    (d) said first, second and third sides being joined each to one other at two opposite edges of said rectangles and to said ends at two other opposite edges of said rectangles;
    (e) said first side supporting a plurality of controls and an air intake;
    (f) said second side providing an air outlet;
    (g) said third side forming a base substantially in a horizontal plane; and
    (h) said housing enclosing filter means, air moving means and sound-generating means.

10. A method for enhancing the environment quality of a workspace consisting in combination of:
    (a) lowering the level of particulate matter in a body of air within said workspace below $10^4$ particles per liter; and
    (b) introducing broad band noise into said workspace, said broad band noise comprising sound waves in the range from 80 Hz to 10 KHz in frequency and 10 to 70 dB in strength and having no outstanding pure tones.

* * * * *